106. COMPOSITIONS, COATING OR PLASTIC.
No. 784,318. PATENTED MAR. 7, 1905.
J. S. GREGG.
COMPOSITION OF MATTER FOR FORMING PIPES OR TUBES, &c.
APPLICATION FILED SEPT. 16, 1904.
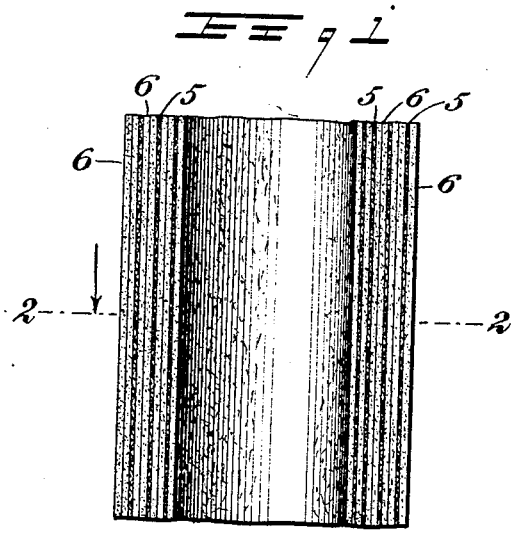
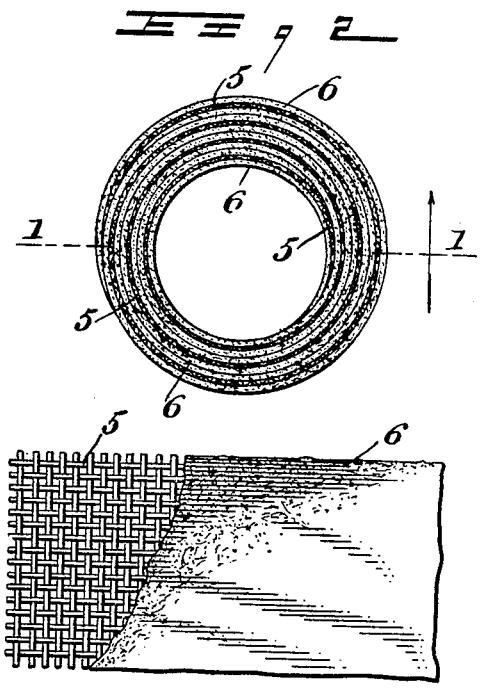
WITNESSES:
John J. Kittle
Wm. P. Patton
INVENTOR
Jerome S. Gregg
BY
Munn
ATTORNEYS No. 784,318.

Patented March 7, 1905.

UNITED STATES PATENT OFFICE.

JEROME S. GREGG, OF POMONA, MICHIGAN.

COMPOSITION OF MATTER FOR FORMING PIPES OR TUBES, &c.

SPECIFICATION forming part of Letters Patent No. 784,318, dated March 7, 1905.

Application filed September 16, 1904. Serial No. 224,690.

*To all whom it may concern:*

Be it known that I, JEROME S. GREGG, a citizen of the United States, and a resident of Pomona, in the county of Manistee and State of Michigan, have invented a new and Improved Composition of Matter for Forming Pipes or Tubes, &c., of which the following is a full, clear, and exact description.

This invention relates to the manufacture of pipes or tubes, &c., from plastic cement, and has for its object to provide a novel plastic composition by means of which tubing can be readily and quickly produced.

The invention consists in the composition of matter as is hereinafter described, and defined in the subjoined claim.

Reference is to be had to the accompanying drawings, forming a part of this specification, in which similar characters of reference indicate corresponding parts in all the figures.

Figure 1 is a longitudinal sectional view of a portion of a tube in the construction of which my composition is employed, the section being substantially on the line 1 1 in Fig. 2. Fig. 2 is a transverse sectional view, substantially on the line 2 2 in Fig. 1; and Fig. 3 is a fragmentary side view of a pipe, broken away to expose an interior reticulated article employed.

The materials employed in the manufacture of the improved tubing consist of equal parts of a good quality of powdered cement and sand and a suitable quantity of powdered resin, all mixed with water impregnated with liquid glue, the liquid being proportioned in amount to render the composition plastic.

In the employment of my composition for forming pipes and tubes I proceed as follows: Upon a level table (not shown) of proper dimensions a single layer of reticulated fabric, such as mosquito-netting, is laid, having a width that defines the length of the pipe or tube to be produced. Upon the reticulated fabric a layer of the prepared plastic composition or cement is evenly distributed, so as to completely cover said fabric. A roller (not shown) having cylindrical form and a diameter equal to the bore of the pipe or tube to be formed thereon is placed at one end of the coated fabric transversely thereof and has sufficient length to project somewhat beyond the side edges of said fabric. The roller is now rolled upon the plastic cement, so as to cause the latter, along with the reticulated fabric, to envelop the cylindrical roller, and this operation is continued until the coated fabric is completely wrapped upon the roller or mandrel that forms a core for the tube thus produced.

In the drawings, 5 indicates the reticulated fabric, and 6 the plastic cement.

It will be evident that the operation hereinbefore described will cause the plastic cement to pass through the interstices in the fabric, which latter may be either metallic or vegetable webbing, and the latter will be spirally disposed throughout the combined spiral layers of plastic compound, serving to bind said layers of cement together and producing a very strong light tube which when dried on the core shrinks away from the latter, so that the roller or core may be readily removed.

Having thus described my invention, I claim as new and desire to secure by Letters Patent—

A composition of matter for a pipe or tube, comprising cement, sand, resin and water impregnated with liquid glue, all mixed together to form a plastic composition.

In testimony whereof I have signed my name to this specification in the presence of two subscribing witnesses.

JEROME S. GREGG.

Witnesses:
L. L. DUFFY,
RILEY RICE.